United States Patent
Park (10) Patent No.: US 8,929,960 B2
(45) Date of Patent: Jan. 6, 2015

(54) VOICE CALL PROCESSING METHOD AND APPARATUS FOR MOBILE TERMINAL

(75) Inventor: Joo Hwan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 12/853,493

(22) Filed: Aug. 10, 2010

(65) Prior Publication Data

US 2011/0053636 A1    Mar. 3, 2011

(30) Foreign Application Priority Data

Sep. 3, 2009   (KR) .................. 10-2009-0082931

(51) Int. Cl.
*H04M 1/00* (2006.01)
*H04M 1/60* (2006.01)

(52) U.S. Cl.
CPC .................................. *H04M 1/6041* (2013.01)
USPC ......... 455/575.7; 455/73; 455/78; 455/569.1; 381/124

(58) Field of Classification Search
USPC ........ 381/123, 77, 81, 84–85; 455/569.1, 560
See application file for complete search history.

(56) References Cited

U.S. PATENT DOCUMENTS

| | | | |
|---|---|---|---|
| 5,940,040 A * | 8/1999 | Koyanagi et al. | 343/702 |
| 6,219,532 B1 * | 4/2001 | Tanaka et al. | 455/78 |
| 6,643,497 B1 * | 11/2003 | Kouyama | 455/83 |
| 6,995,716 B2 * | 2/2006 | Hwang et al. | 343/702 |
| 7,548,762 B2 * | 6/2009 | Fabrega-Sanchez et al. | 455/556.1 |
| 8,509,845 B2 * | 8/2013 | Park et al. | 455/553.1 |
| 2002/0049079 A1 * | 4/2002 | Buckley et al. | 455/568 |
| 2003/0152243 A1 * | 8/2003 | Julstrom et al. | 381/315 |
| 2004/0192406 A1 * | 9/2004 | Okazaki et al. | 455/569.1 |
| 2008/0159565 A1 * | 7/2008 | Kim | 381/107 |
| 2009/0197638 A1 * | 8/2009 | Park et al. | 455/553.1 |
| 2011/0076966 A1 * | 3/2011 | Ishimiya | 455/78 |
| 2012/0108195 A1 * | 5/2012 | Choi et al. | 455/296 |

* cited by examiner

*Primary Examiner* — Disler Paul
(74) *Attorney, Agent, or Firm* — Jefferson IP Law, LLP (57) ABSTRACT

A voice call processing method and apparatus for a mobile terminal are provided for improving voice communication quality by switching between matching circuits that are optimized for respective audio output modes of the mobile terminal. The mobile terminal includes at least two matching circuits designated for individual audio output modes, a mode tracking unit for detecting a change from a first audio output mode to a second audio output mode, a control unit for identifying the second audio output mode and the matching circuit designated for the second audio output mode and for outputting a control signal for switching to the matching circuit designated for the second audio output mode, and a switch for switching the signal path between the at least two matching circuits based on the control signal output by the control unit.

15 Claims, 4 Drawing Sheets

VOICE CALL PROCESSING METHOD AND APPARATUS FOR MOBILE TERMINAL

PRIORITY

This application claims the benefit under 35 U.S.C. §119(a) of a Korean patent application filed on Sep. 3, 2009 in the Korean Intellectual Property Office and assigned Serial No. 10-2009-0082931, the entire disclosure of which is hereby incorporated by reference.

BACKGROUND OF THE INVENTION

1. Field of the Invention

The present invention relates to a mobile terminal. More particularly, the present invention relates to a voice call processing method and apparatus for a mobile terminal that is capable of improving voice communication quality by switching between matching circuits that are optimized for respective audio output modes of the mobile terminal.

2. Description of the Related Art

Voice quality is an important factor to determine performance of a mobile communication terminal. Accordingly, research has been conducted to improve voice quality in a mobile communication field.

Most of conventional research has focused on voice quality enhancement based on the type of mobile terminal without taking into consideration a communication status of a user. That is, conventional voice quality enhancement research has been conducted to optimize the voice quality in various types of mobile terminals such as a bar type, a slide type, and a folder type.

When using the conventional technologies, the mobile terminal in idle mode is expected to improve reception performance according to the type of voice enhancement schemes. However, conventional voice call processing methods do not take into consideration variations of an antenna pattern according to an audio output mode (e.g., a speaker mode, an earphone mode, and a speakerphone mode), resulting in degradation of voice quality in an actual communication environment.

That is, there is no method provided for optimizing a matching circuit according to an antenna radiation pattern change in the speaker mode which results in a problem with using the mobile terminal. For this reason, the conventional mobile terminals do not react sensitively to the change of frequency characteristics of antennas in the speaker mode which is most commonly used for voice communication, resulting in degradation of communication quality in speaker mode.

Therefore, a need exists for a method and apparatus for improving communication quality in a mobile terminal.

SUMMARY OF THE INVENTION

An aspect of the present invention is to address at least the above-mentioned problems and/or disadvantages and to provide at least the advantages described below. Accordingly, an aspect of the present invention is to provide a voice call processing method and apparatus for a mobile terminal that is capable of improving voice communication quality using multiple matching circuits prepared for individual audio output modes.

Another aspect of the present invention is to provide a voice call processing method and apparatus for a mobile terminal that is capable of improving voice communication quality by switching between matching circuits that are optimized for respective audio output modes.

Still another aspect of the present invention is to provide a voice call processing method and apparatus for a mobile terminal that is capable of securing stable communication quality by improving antenna performance with automatic signal path establishment to the matching circuit that is optimized for the speaker mode when the mobile terminal operates in speaker mode.

In accordance with an aspect of the present invention, a mobile terminal is provided. The terminal includes at least two matching circuits designated for individual audio output modes, a mode tracking unit for detecting a change from a first audio output mode to a second audio output mode, a control unit for identifying the second audio output mode and the matching circuit designated for the second audio output mode and for outputting a control signal for switching to the matching circuit designated for the second audio output mode, and a switch for switching the signal path between the at least two matching circuits based on the control signal output by the control unit.

In accordance with another aspect of the present invention, a method for processing a voice call in a mobile terminal is provided. The method includes determining a current audio output mode of the mobile terminal during voice communication, identifying a matching circuit designated for the current audio output mode, establishing a signal path with the identified matching circuit, and processing signals transmitted and received through the signal path.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an exemplary embodiment of the present invention, a method and apparatus for improving antenna performance of a mobile terminal is provided. Typically, the antenna of the mobile terminal is designed to have a radiation pattern with minimum change to the terminal usage environment and ambient environment. When using the mobile terminal, the antenna radiation pattern of the mobile terminal may vary due to noise caused by holding the mobile terminal, which degrades communication quality such as signal transmission and reception success rates. In an exemplary implementation, the mobile terminal switches to the matching circuit or the antenna that is optimized to the speaker mode, which significantly influences the antenna performance, automatically when the mobile terminal operates in speaker mode, resulting in stable communication quality. That is, a voice call processing method is implemented with multiple audio output modes classified into a speaker mode and a non-speaker mode, and the matching circuits that are optimized to the respective modes and switches between the matching circuits depending on current audio output mode, resulting in improved communication quality. In an exemplary implementation, the mobile terminal verifies the current audio output mode and processes the signal by means of the matching circuit that is optimized to the current audio output mode.

In an exemplary implementation, the speaker mode is an operation mode in which a user holds the mobile terminal in a hand and places the mobile terminal across the user's face to speak in the microphone of the mobile terminal and hear a counterparty's voice through the speaker of the mobile terminal.

The structure and operations of the mobile terminal according to an exemplary embodiment of the present invention are described below with reference to FIGS. 1 to 4. However, the present invention is not limited thereto and may be implemented with various modifications.

Figure 1:
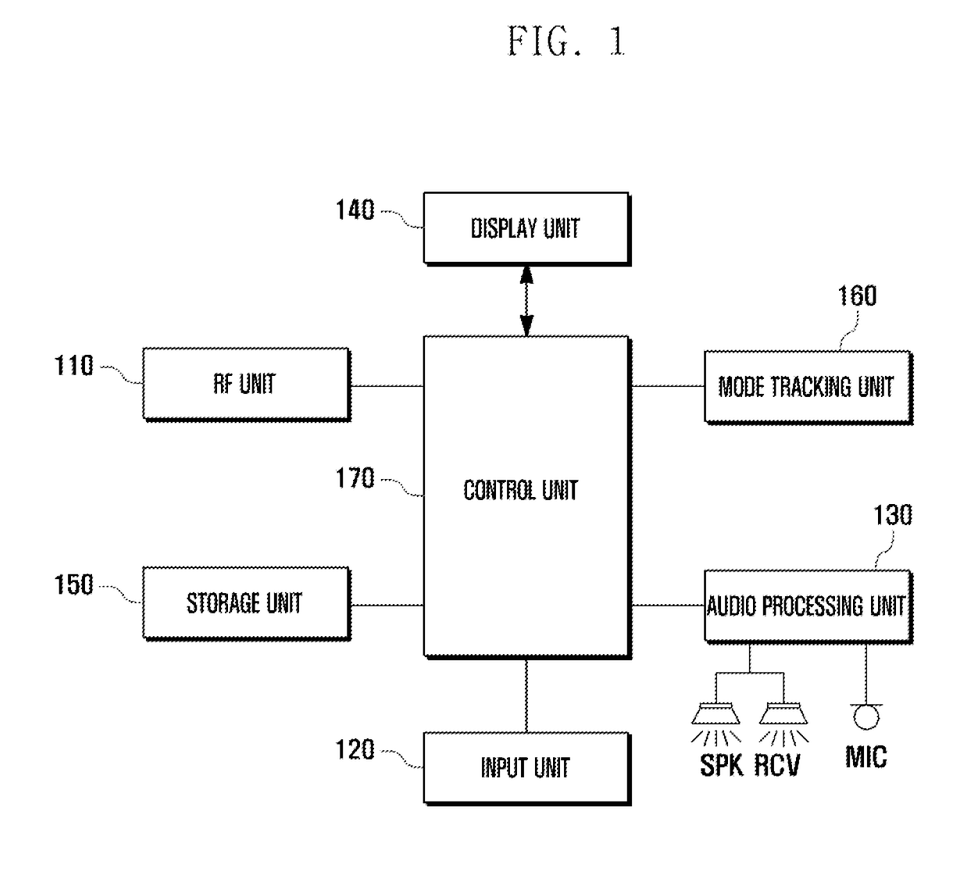
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes a Radio Frequency (RF) unit 110, an input unit 120, an audio processing unit 130, a display unit 140, a storage unit 150, a mode tracking unit 160, and a control unit 170.

The RF unit 110 transmits and receives radio energy. The RF unit 110 establishes a communication channel with a network (i.e., a base station) such that the mobile terminal may perform voice and data communications. Although a single RF unit is depicted in FIG. 1, the mobile terminal may be implemented with more than one RF unit when configured to support multiple communication systems. The RF unit 110 may include an RF transmitter for up-converting and amplifying a transmission radio signal and an RF receiver for low noise amplifying and down-converting a received radio signal.

More particularly, the RF unit 110 may be provided with multiple matching circuits that are optimized for individual voice input/output modes to minimize variation of the antenna radiation pattern in each audio output mode. In this case, the RF unit 110 includes a switch for switching between the matching circuits depending on the audio output mode. The configuration of the RF unit 110 is described in more detail below with reference to FIG. 2.

The input unit 120 receives various input data and transfers the signals input for the configuration and control of the functions of the mobile terminal to the control unit 170. The input unit 120 may be implemented with at least one of a touchpad, a normal keypad (e.g. a 4×3 or 3×4 keypad), and a QWERTY keypad. The input unit 120 may be implemented in association with a touchscreen which functions as both an input device and a display device.

The audio processing unit 130 is connected to a Microphone (MIC) and a Speaker/Receiver (SPK/RCV). The audio processing unit 130 processes a voice signal input through the MIC into data to be output to the control unit 170 and processes the voice signal provided by the control unit 190 to be output through the SPK/RCV in the form of an audible wave. The audio processing unit 130 converts the analog voice signal input through the MIC to a digital voice signal and converts the digital voice signal input by the control unit 170 into an analog signal to be output through the SPK/RCV. The audio processing unit 130 may play various audio resources such as a Moving Picture Experts Group-2 Audio Layer 3 (MP3) file according to the user's intention.

The display unit 140 displays various visual data, generated while the mobile terminal is performing any function, and status information related to the user's manipulation and function settings. The display unit 140 may display various screen data related to an operation condition and status of the mobile terminal. The display unit 140 may display various visual signals and color information output by the control unit 170. The display unit 140 may be implemented with any of a Liquid Crystal Display (LCD) panel, an Organic Light Emitting Diode (OLED) panel, and an Active Matrix OLED (AMOLED) panel. The display unit 140 may be configured with touchscreen functionality.

The storage unit 150 may be implemented with at least one of a Read Only Memory (ROM) and a Random Access Memory (RAM). The storage unit 150 stores various kinds of data generated and used by the mobile terminal. The data may include all kinds of data generated while application programs are running in the mobile terminal and received from the outside (e.g., a base station, a personal computer and the like). The storage unit 150 also may store parameters and settings required for communication by means of the RF unit 110.

The storage unit 150 may include at least one buffer for buffering data generated while the mobile terminal performs specific functions. The storage unit 150 may include at least one of a memory module located inside of the mobile terminal and an external storage such as a smartcard. The storage unit 150 may include at least one of a ROM, a Flash Memory, a RAM, any combined form of storage media, Multi Chip Package (MCP) memory, and the like.

The mode tracking unit 160 may include at least one of a proximity sensor for detecting when the mobile terminal is held close to the user's body (i.e., the face) and an audio path detector for detecting an audio output path when the mobile terminal outputs an audio signal. In a case where the mode tracking unit 160 is implemented with the proximity sensor, the proximity sensor detects when the mobile terminal is held close to the user's body and outputs the detection result to the control unit 170. In a case where the mode tracking unit 160 is implemented with the audio path detector, the audio path detector detects the audio path over which the audio signal flows and outputs the detection result to the control unit 170. The mode tracking unit 160 is responsible for providing information for determining the current audio output mode of the mobile terminal. The operation of the mode tracking unit 160 is described in more detail with reference to FIG. 2 below.

The control unit 170 controls entire operations of the mobile terminal and signaling among internal function blocks of the mobile terminal. The control unit 170 controls signaling among the RF unit 110, the input unit 120, the audio processing unit 130, the display unit 140, the storage unit 150, and the mode tracking unit 160.

More particularly, the control unit 170 determines the current audio output mode based on the signal provided by the mode tracking unit 160 and controls switching to the matching circuit that is optimized for the current audio output mode. The control unit 170 may select the matching circuit based on the signal provided by the mode tracking unit 160 and establish a signal path with the selected matching circuit that is optimized for a current audio output mode. The control unit 170 may distinguish between the speaker mode and non-speaker mode while the mobile terminal is in voice communication mode and control to select the matching circuit that is optimized for the current audio output mode. The control unit 170 controls entire operations of the mobile terminal that are described below with reference to FIGS. 2 to 4.

Although the mobile terminal is depicted schematically in FIG. 1 for simplifying the explanation, the present invention is not limited thereto.

For example, the control unit 170 may include a baseband module for processing mobile communication services supported by the mobile terminal. The baseband module may be incorporated into at least one of the control unit 170 and the RF unit 110.

Although not depicted in FIG. 1, the mobile terminal may include at least one of a camera module for taking a picture of a subject, a Local Area Network (LAN) module for supporting LAN communication, an Internet access module for supporting Internet access, a digital broadcast module for receiving and playing digital broadcast data such as Digital Multimedia Broadcasting (DMB) and Digital Video Broadcasting (DVB) data, and a short range wireless communication module such as a Bluetooth module for short range wireless communication.

Although not described herein, the mobile terminal may further include other devices equivalent to the above described function modules. Also, it should be understood that each of the internal function blocks constituting the mobile terminal may be omitted or replaced by other equivalent device.

Figure 2:
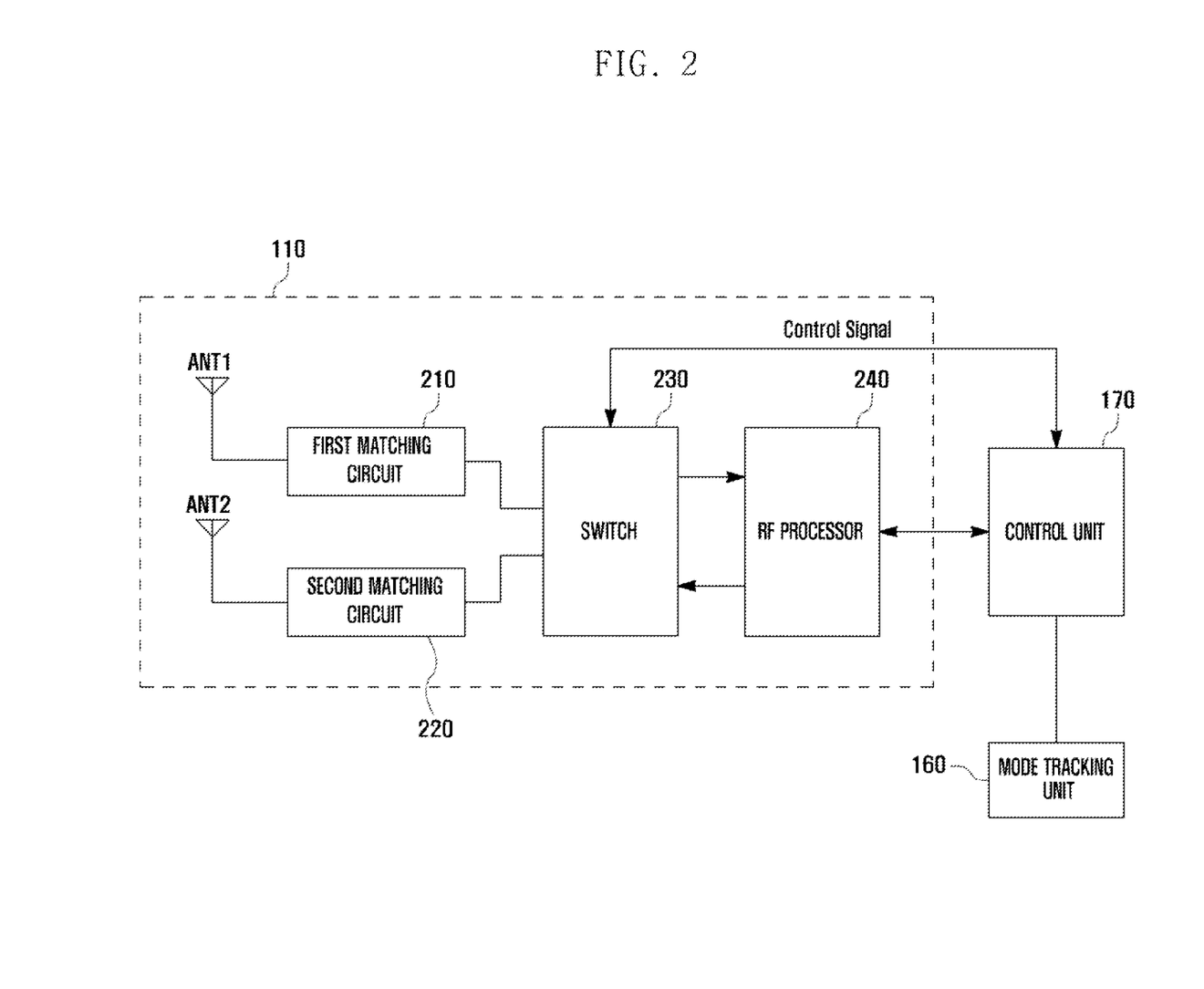
FIG. 2 is a block diagram illustrating a configuration of a Radio Frequency (RF) unit of a mobile terminal according to an exemplary embodiment of the present invention.

FIG. 2 is a block diagram illustrating a configuration of an RF unit of a mobile terminal according to an exemplary embodiment of the present invention.

Referring to FIG. 2, the Radio Frequency (RF) unit 110 includes a first antenna (ANT1), a second antenna (ANT2), a first matching circuit 210, a second matching circuit 220, a switch 230, and an RF processor 240. However, the RF unit 110 may be configured to be applied to the mobile terminal in which the first matching circuit 210 and the second matching circuit 220 are connected to a single antenna. Additionally, the RF unit 110 may be configured with more than two matching circuits and more than two antennas.

The mobile terminal transmits and receives radio signals by means of ANT1 and ANT2. In an exemplary implementation, ANT1 is connected to the first matching circuit 210 for signal transfer in speaker mode, and ANT2 is connected to the second matching circuit 220 for signal transfer in non-speaker mode.

The first matching circuit 210 is optimized for the speaker mode. The first matching circuit performs transmission/reception signal matching with first impedance for communication with a network when the mobile terminal is in speaker mode.

The second matching circuit 220 is optimized for the non-speaker mode (e.g., an idle mode, a hands-free mode, an earphone mode and the like). The second matching circuit 220 performs transmission/reception signal matching with second impedance for the communication with the network when the mobile terminal is in non-speaker mode.

Herein, the impedance is a resistance to a signal, and impedance matching matches the receiver's impedance to the transmitter's impedance to avoid signal loss. In an exemplary implementation, the first matching circuit 210 is a matching circuit that is optimized for the speaker mode, and the second matching circuit 220 is a matching circuit that is optimized for the hands-free mode and the earphone mode.

The switch 230 is responsible for switching between the first matching circuit 210 and the second matching circuit 220 according to the control signal from the control unit 170. That is, the switch 230 switches the path to the RF processor 240 between the first matching circuit 210 and the second matching circuit 220.

The RF processor 240 up-converts and amplifies the transmission signal and low-noise-amplifies and down-converts the received signal.

The mode tracking unit 160 detects the current audio output mode of the mobile terminal and transfers the detection result to the control unit 170. That is, the mode tracking unit 160 determines whether the current audio output mode is the speaker mode or the non-speaker mode and informs the control unit 170 of the current audio output mode.

In an exemplary implementation, the mode tracking unit 160 may be incorporated into the control unit 170 or implemented separately. The mode tracking unit 160 may be implemented with a proximity sensor for detecting when the mobile terminal is held close to the user's body (i.e., the face) or an audio path detector for detecting the audio path of a Receiver (RCV) of the mobile terminal. In a case of using the audio path detector, the mode tracking unit 160 may be incorporated into the control unit 170.

The control unit 170 processes the signal transmission/reception in association with the first matching circuit 210 or the second matching circuit 220 according to the current audio output mode. That is, the control unit 170 receives the audio output mode information provided by the mode tracking unit 160 and outputs a control signal to the switch 230 such that the switch 230 switches the RF processor 240 to one of the first matching circuit 210 and the second matching circuit 220 according to the control signal. The control unit 170 recognizes the current audio output mode of the mobile terminal based on the proximity of the mobile terminal to the user's body and controls the switch 230 to connect the RF processor 240 to one of the first matching circuit 210 and the second matching circuit 220 according to the current audio output mode. Also, the control unit 170 recognizes the current audio output mode of the mobile terminal based on whether the audio signal is output through the SPK or the RCV and controls the switch 230 to connect the RF processor 240 to one of the first matching circuit 210 and the second matching circuit 220 according to the current audio output mode.

If it is determined that the mobile terminal is operating in the speaker mode, the control unit 170 outputs the control signal indicating the first matching unit 210 to the switch 230 such that the switch 230 switches the signal path of the RF processor 240 to the first matching circuit 210. If it is determined that the mobile terminal is operating in the non-speaker mode, the control unit 170 outputs the control signal indicating the second matching unit 210 to the switch 230 such that the switch 230 switches the signal path of the RF processor 240 to the second matching circuit 220.

Figure 3:
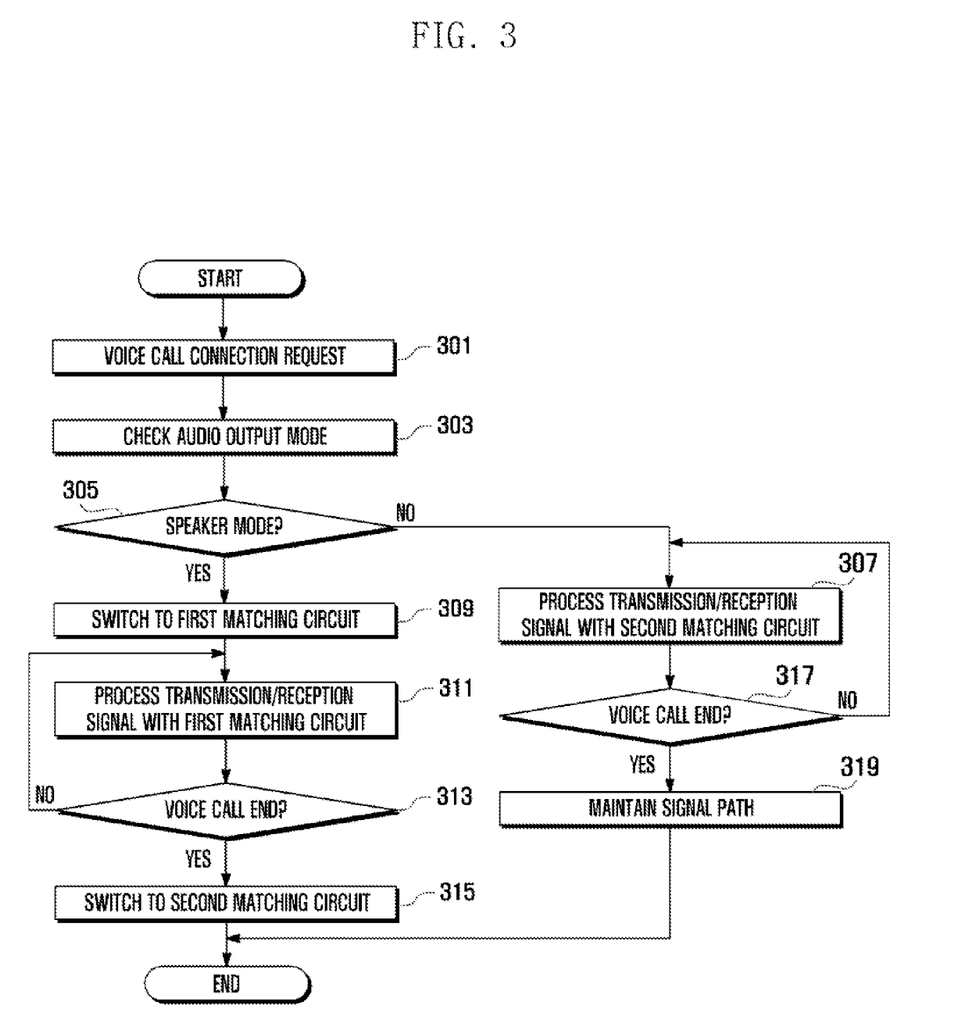
FIG. 3 is a flowchart illustrating a voice call processing method for a mobile terminal according to an exemplary embodiment of the present invention.

FIG. 3 is a flowchart illustrating a voice call processing method for a mobile terminal according to an exemplary embodiment of the present invention.

Referring to FIG. 3, the control unit 170 detects a voice call connection request and executes a voice communication mode in response to a user request in step 301. The voice call connection request may be input to receive an incoming call or to make an outgoing call.

If the voice call connection request is detected, the control unit 170 verifies the current audio output mode of the mobile terminal in step 303 and determines whether the current audio output mode is a speaker mode in step 305.

At this time, the control unit 170 may determine the current audio output mode depending on whether there is an event output in association with the current audio output mode. For example, when the mobile terminal enters the voice communication mode, a mode tracking unit 160 determines whether proximity is detected or whether the radio path is connected to the receiver or the speaker, and outputs a detection signal to the control unit 170. The control unit 170 determines the current audio output mode of the mobile terminal based on the detection signal provided by the mode tracking unit 160.

If it is determined that the current audio output mode is not the speaker mode, the control unit 170 processes the transmission/reception signals with a matching circuit configured for non-speaker modes in step 307. That is, the control unit 170 controls the switch 230 to connect the RF processor 240 to a second matching circuit 220 that is optimized for the non-speaker modes.

If it is determined that the current audio output mode is the speaker mode in step 305, the control unit 170 controls the switch 230 to connect the RF processor 240 to a first matching circuit 210 that is optimized for the speaker mode in step 309. Next, the control unit 170 processes the transmission/reception signals with a matching circuit configured for the speaker mode in step 311. For example, the control unit 170 controls the switch 230 to connect the RF processor 240 to the first matching circuit 210 such that the signals are transmitted and received via the first matching circuit 210.

If the voice communication mode is finished, the control unit 170 may finish the current audio output mode. For example, if the voice communication is finished in the speaker mode in step 313, the control unit 170 switches the signal path of the RF processor 240 to the second matching circuit 220 in step 315. If the voice communication is finished in the non-speaker mode in step 317, the control unit 170 maintains the current signal path, i.e., the connection between the RF processor 240 to the second matching circuit 220 in step 319.

Figure 4:
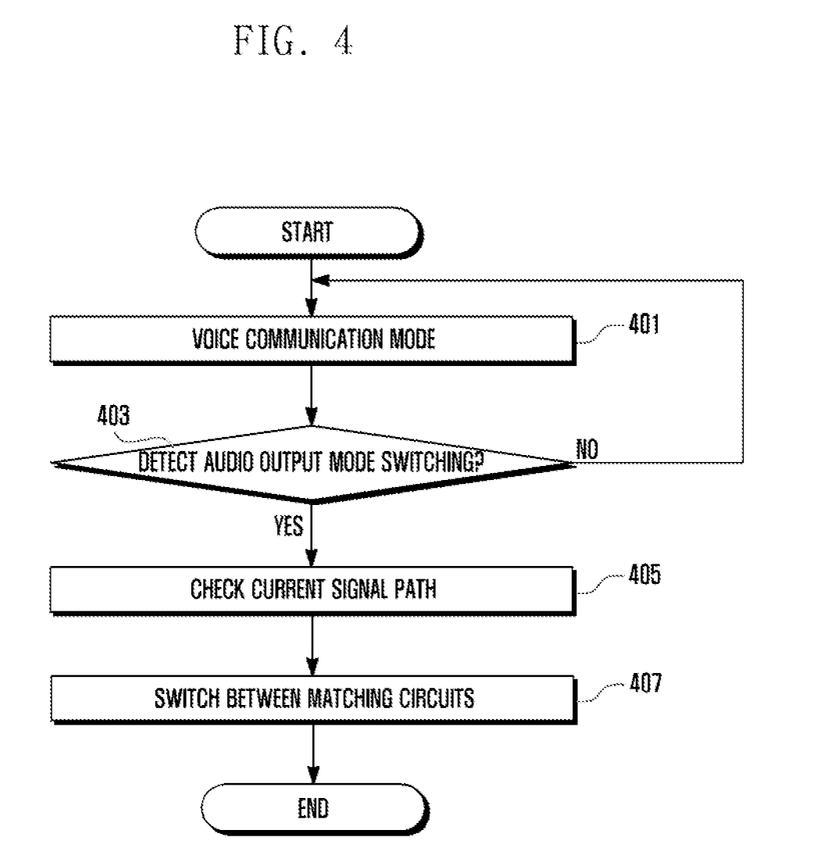
FIG. 4 is a flowchart illustrating a signal path switching procedure of a voice call processing method for a mobile terminal according to an exemplary embodiment of the present invention.

FIG. 4 is a flowchart illustrating a signal path switching procedure of a voice call processing method for a mobile terminal according to an exemplary embodiment of the present invention.

Referring to FIG. 4, while the mobile terminal is in voice communication mode in step 401, the control unit 170 may detect an audio output mode switching request in the middle of voice communication in step 403. A user may change the audio output mode from the speaker mode to a non-speaker mode, such as from a speakerphone mode, to earphone mode and vice versa, during voice communication.

If the audio output mode switching request is detected, the control unit verifies the current signal path in step 405. That is, the control unit 170 determines whether the mobile terminal is in the speaker mode in which the signal path is made with a first matching circuit 210 or a non-speaker mode in which the signal path is made with a second matching circuit 220.

The control unit 170 performs switching between the matching circuits in step 407. That is, the control unit 170 controls the switch 230 to switch the signal path of the Radio Frequency (RF) processor 240 from the current matching circuit to the other matching circuit in response to the audio output mode switching request.

For example, if the mobile terminal operating in the speaker mode moves away from the user's body, a mode tracking unit 160 transmits a matching circuit switching signal to the control unit 170. If the matching circuit switching signal is received, the control unit 170 recognizes the change of the audio output mode from the speaker mode to the non-speaker mode and controls the switch 230 to switch the signal path of the RF processor 240 from the first matching circuit 210 to the second matching circuit 220.

Also, if the mobile terminal operating in the non-speaker mode (i.e., the earphone mode or the speakerphone mode) is held close to the user's body (i.e., the face), the mode tracking unit 160 transmits the matching circuit switching signal to the control unit 170. If the matching circuit switching signal is received, the control unit 170 recognizes the change of the audio output mode from the non-speaker mode to the speaker mode and thus controls the switch 230 to switch the signal path of the RF processor 240 from the second matching circuit 220 to the first matching circuit 210.

Also, if the output audio path of the mobile terminal is changed from the SPK to the RCV, the mode tracking unit 160 may transmit the matching circuit switching signal to the control unit 170. If the matching circuit switching signal is received, the control unit 170 recognizes the change of the audio output mode from the non-speaker mode (i.e., the earphone mode or the speakerphone mode) to the speaker mode and thus controls the switch 230 to switch the signal path of the RF processor 240 from the second matching circuit 220 to the first matching circuit 210.

Also, if the output audio path of the mobile terminal is changed from the receiver to the speaker, the mode tracking unit 160 sends the matching circuit switching signal to the control unit 170. If the matching circuit switching signal is received, the control unit 170 recognizes the change of the audio output mode from the speaker mode to the non-speaker mode (i.e., earphone mode or speakerphone mode) and thus controls the switch 230 to switch the signal path of the RF processor 240 from the first matching circuit 210 to the second matching circuit 220.

As described above, the voice call processing method and apparatus switches between two matching circuits that are optimized for a speaker audio output mode and a non-speaker audio output mode depending on the current audio output mode of the mobile terminal, thereby maintaining stable voice communication quality regardless of the change of the audio output mode. Also, the voice call processing method and apparatus switches the signal path between the matching circuits that are optimized for the speaker audio output mode and non-speaker audio output mode according to the change of the audio output mode, resulting in improvement of voice communication service quality. Also, the voice call processing method and apparatus is advantageous to minimize a Specific Absorption Rate (SAR) to the body as well as to maintain the voice communication quality of the mobile terminal.

The above-described methods according to exemplary embodiments of the present invention may be implemented in hardware or as software or computer code that can be stored in a recording medium such as a CD ROM, an Random Access Memory (RAM), a floppy disk, a hard disk, or a magneto-optical disk or downloaded over a network, so that the methods described herein can be rendered in such software using a general purpose computer, or a special processor or in programmable or dedicated hardware, such as an Application Specific Integrated Circuit (ASIC) or Field Programmable Gate Array (FPGA). As would be understood in the art, the computer, the processor or the programmable hardware include memory components, e.g., RAM, Read Only Memory (ROM), Flash, and the like that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal comprising:
   a first antenna and a second antenna;
   a first matching circuit and a second matching circuit, each matching circuit designated for individual audio output modes of the mobile terminal, the first matching circuit directly coupled to the first antenna and the second matching circuit directly coupled to the second antenna;
   a control unit for detecting a change from a speaker output mode to a non-speaker output mode, for detecting an audio path connected to at least one of a receiver, an earphone and a speaker, for identifying the non-speaker output mode by detecting the audio path connected to the receiver and to the second matching circuit designated for the non-speaker output mode and for outputting a control signal for switching to the first matching circuit designated for the speaker output mode; and
   a switch for switching the signal path between the first matching circuit and the second matching circuit based on the control signal output by the control unit.

2. The mobile terminal of claim 1, wherein the first matching circuit performs transmission and reception signal matching with a first impedance for communication with a network when the mobile terminal is in the speaker output mode, and the second matching circuit performs transmission and reception signal matching with a second impedance for the communication with the network when the mobile terminal is in the non-speaker output mode.

3. The mobile terminal of claim 2, wherein the impedance comprises resistance to a signal and impedance matching matches a receiver's impedance to a transmitter's impedance to avoid signal loss.

4. The mobile terminal of claim 1, further comprises a proximity sensor for sensing proximity of the mobile terminal to a user's body.

5. The mobile terminal of claim 4, wherein, when the proximity of the mobile terminal is detected by the proximity sensor, the control unit determines that the mobile terminal is in the speaker output mode and controls the switch to connect the signal path to the first matching circuit.

6. The mobile terminal of claim 1, wherein, when the audio path detector detects the audio output path connected to the receiver, the control unit determines that the mobile terminal is in the speaker output mode and controls the switch to connect the signal path to the first matching circuit.

7. A method for processing a voice call in a mobile terminal, the method comprising:
   detecting a change from a speaker output mode to a non-speaker output mode;
   determining a current audio output mode of the mobile terminal during voice communication by detecting an audio path connected to at least one of a receiver of the mobile terminal, an earphone of the mobile terminal and a speaker of the mobile terminal and whether the current audio output mode is at least one of the speaker output mode and the non-speaker output mode;
   identifying a matching circuit from amongst a first matching circuit and a second matching circuit respectively and directly coupled to a first antenna and a second antenna designated for the current audio output mode;
   determining the matching circuit designated for another audio output mode;
   switching a signal path to the matching circuit designated for another audio output mode;
   establishing the signal path with the identified matching circuit; and
   processing signals transmitted and received through the signal path.

8. The method of claim 7, wherein the determining of the current audio output mode comprises at least one of determining whether a proximity signal is output by proximity of the mobile terminal to a user's body and determining whether the audio path is connected to a receiver.

9. The method of claim 8, wherein the determining of the current audio output mode comprises, if at least one of the proximity signal is output by proximity of the mobile terminal to a user's body and the audio path is connected to the receiver, determining that the current audio output mode is the speaker output mode.

10. The method of claim 7, further comprising:
    determining whether the mobile terminal is in the speaker output mode when the voice communication is finished; and
    switching, if the mobile terminal is in the speaker output mode when the voice communication is finished, to the matching circuit designated for the non-speaker output mode.

11. The method of claim 7, wherein the determining of the matching circuit comprises determining whether the signal path is set for the speaker output mode or the non-speaker output mode.

12. The method of claim 11, wherein a first matching circuit performs transmission and reception signal matching with a first impedance for communication with a network when the mobile terminal is in the speaker output mode, and a second matching circuit performs transmission and reception signal matching with a second impedance for the communication with the network when the mobile terminal is in the non-speaker output mode.

13. The method of claim 12, wherein the impedance comprises resistance to a signal and impedance matching matches the receiver's impedance to a transmitter's impedance to avoid signal loss.

14. The method of claim 7, wherein the detecting of the change from the current audio output mode to another audio output mode comprises determining whether proximity of the mobile terminal to the user's body is changed.

15. The method of claim 7, wherein the detecting of the change from the current audio output mode to another audio output mode comprises determining whether an audio output path is changed.

* * * * *